Patented July 26, 1932

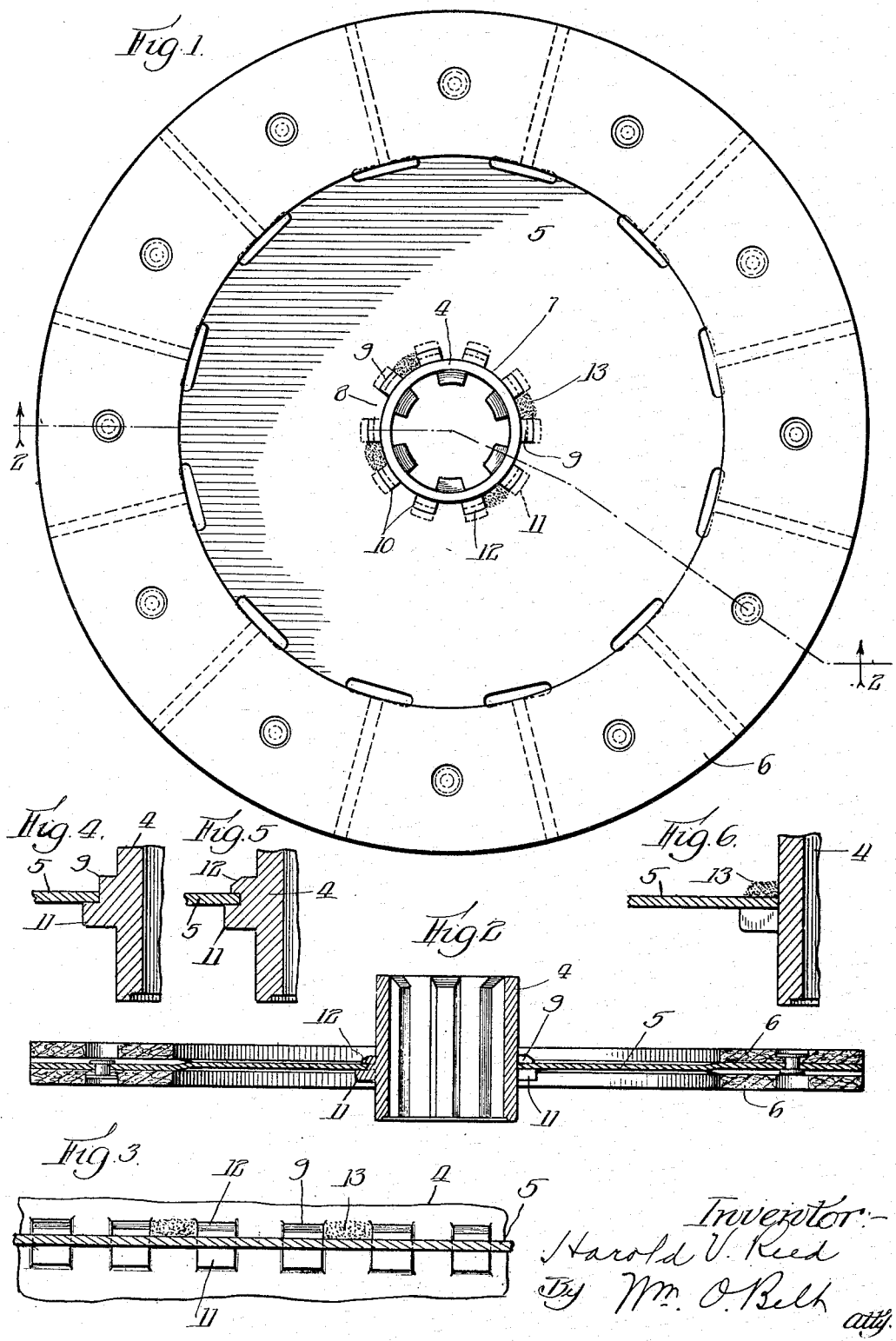

1,868,764

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

CLUTCH PLATE

Application filed May 4, 1929. Serial No. 360,478.

This invention relates to clutch plates of the kind which are gripped or clamped between the parts of a friction clutch under sufficient pressure to impart motion from the driving member to the driven member of the clutch.

Clutch plates of this type comprise a hub member and a disk member carrying friction rings or facings, and the objects of the invention are to provide novel and simple means for securely and rigidly mounting the disk on the hub without the use of rivets or other such fastening devices; to reduce the weight of the plate; and to enable the disk member to be easily and quickly mounted on the hub member and secured thereto in a firm and rigid manner.

In the accompanying drawing illustrating a selected embodiment of the invention, Fig. 1 is a side elevation of a clutch plate.

Fig. 2 is a sectional view on the line 2—2 of Fig. 1.

Fig. 3 is a developed view looking at the hub and showing a plurality of the interengaging parts of the plate and hub.

Fig. 4 is a detail enlarged sectional view showing the plate assembled with the hub and before it is secured against lateral movement thereon.

Fig. 5 is a similar view showing the lug peened to secure the plate against lateral movement on the hub.

Fig. 6 is also a similar view showing the weld.

Referring to the drawing the clutch plate comprises a hub member 4, and a disk member 5 carrying friction rings or facings 6. The disk 5 is stamped from sheet metal and may be in any form and shape suitable for the purpose. The friction rings may be of any suitable kind and material, they may be continuous or discontinuous and fastened to the disk, or they may be continuous and free from the disk. My present invention has to do with the manner and means for mounting the disk on and securing it to the hub and it can be embodied with disks and hubs of different varieties and in clutch plates of different kinds and for different purposes.

The disk is provided with a central opening 7 to receive the hub and I form the edge of this opening with teeth or projections 8 to interlock with lugs 9 on the hub. The teeth and lugs shown in the drawing are radially disposed to snugly interlock and the teeth may conveniently be made by hobbing in a hobbing machine or otherwise as may be found desirable and suitable. This form of tooth and lug provides straight opposing side walls 10 on the disk and hub and produces an efficient interlocking and driving engagement between the disk and hub. To retain the disk and the lugs 9 of the hub I provide each lug with a flange 11 which projects radially beyond the lug alongside the disk. The lug is axially wider than the thickness of the disk and after the hub and disk have been assembled with the disk against the flanges 11, Fig. 4, the outer edges of the lugs are peened at 12 or otherwise deformed to clamp the plate on the lugs between the flanges at one end of the lugs and the peened or otherwise deformed other end of the lugs. Thus the disk is held rigidly on the hub against relative rotatable movement by interengagement of the teeth and lugs and against lateral movement by the flanges 11 and the peening or deforming at 12, or I may arc weld the plate to the hub as indicated at 13, Fig. 6. For arc welding I place a metal button on the hub between two lugs and against the plate and arc weld it to the body of the hub, the adjacent lugs on the hub, and to the plate to securely fasten the plate on the hub. I may use the arc weld instead of peening or deforming the lugs as an alternative method of securing the plate rigidly on the hub against lateral displacement but I prefer to use both methods, peening or deforming some or all of the lugs and providing a plurality of arc welds, Fig. 3. The flange 11 is an integral part of the lug 9 and it may also be described as a stepped lug. The invention provides a clutch plate of simple construction and light in weight, comprising a hub and a disk which can be easily and quickly assembled and rigidly secured one upon the other without the necessity of using rivets, bolts or other separate fastening devices. The invention reduces the number of parts required for a clutch plate and decreases the cost and facilitates the manufacture. The novel manner and means of mounting the disk on the hub provides a substantial and efficient engagement between the disk and hub which will maintain throughout the life of the plate. The teeth and lugs provide interfitting notches and projections of substantial character which form a strong, efficient and rigid driving connection between the disk and hub.

I have shown the invention in a selected embodiment of simple form but the details of construction may be varied to suit different conditions and for other purposes and I reserve the right to make all such changes as fall within the scope of the following claims:

I claim:

1. A clutch plate comprising a hub having a plurality of spaced lugs thereon, a disk having an opening to receive the hub and notches to receive the lugs to effect a driving engagement between the disk and hub, flanges integral with said lugs and engaging one side of the disk, said lugs extending axially of the hub from the flanges to a greater distance than the thickness of the disk and having the extended ends deformed to engage the other side of the disk and to cooperate with the flanges for securing the disk against lateral displacement on the hub.

2. A clutch plate comprising a hub having a plurality of spaced lugs thereon, a disk having an opening to receive the hub and notches to receive the lugs to effect a driving engagement between the disk and hub, flanges integral with said lugs and engaging one side of the disk, said lugs extending axially of the hub from the flanges to a greater distance than the thickness of the disk and some of said lugs having the extended ends deformed to engage the other side of the disk and to cooperate with the flanges for securing the disk against lateral displacement on the hub, and arc welds on the hub between some of said lugs for welding the disk to said lugs and the hubs against lateral displacement on the hub.

HAROLD V. REED.